Jan. 24, 1961  L. A. B. PILKINGTON  2,968,893
MANUFACTURE OF FLAT GLASS IN CONTINUOUS RIBBON FORM
Filed Oct. 16, 1956
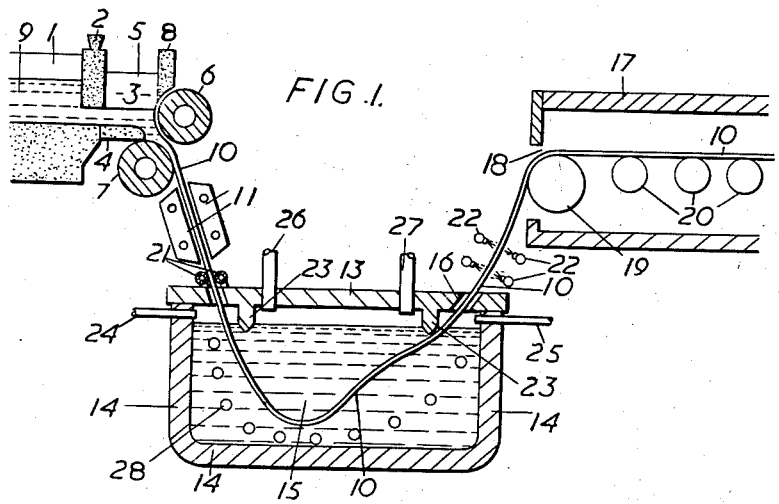
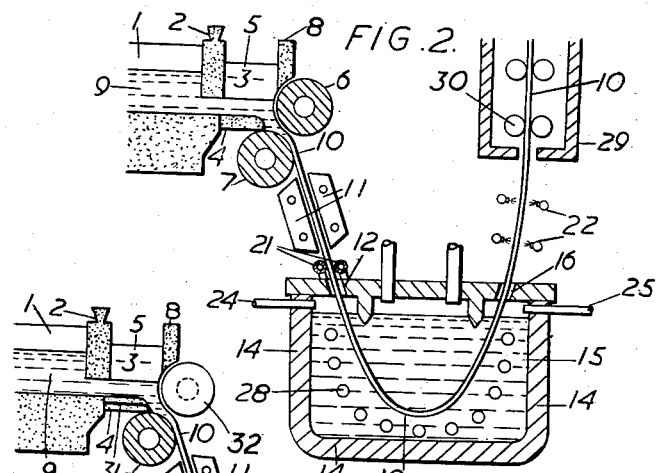
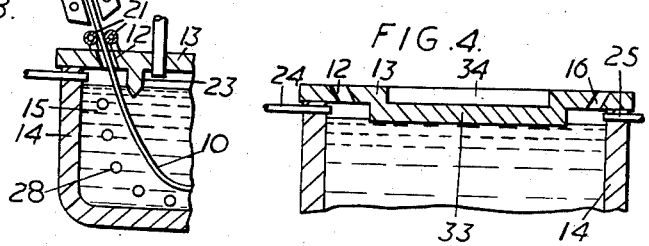
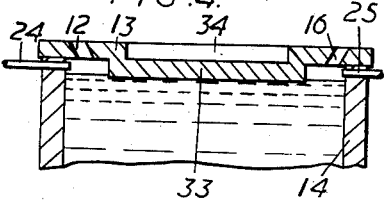
Inventor
Lionel Alexander Bethune Pilkington
By
Morrison, Kennedy, Campbell
Attorneys

United States Patent Office 2,968,893
Patented Jan. 24, 1961

2,968,893

MANUFACTURE OF FLAT GLASS IN CONTINUOUS RIBBON FORM

Lionel Alexander Bethune Pilkington, Rainhill, England, assignor to Pilkington Brothers Limited, Liverpool, England, a corporation of Great Britain Filed Oct. 16, 1956, Ser. No. 616,207

Claims priority, application Great Britain Oct. 18, 1955

3 Claims. (Cl. 49—3)

This invention relates to the manufacture of flat glass in continuous ribbon form.

In the manufacture of flat glass in continuous ribbon form the usual practice is to flow the molten glass from which the ribbon is to be formed, from a spout of a tank furnace in which the glass is melted, to the pass between casting rolls which are driven at a slow peripheral speed which is substantially the same as the speed of the ribbon of glass which emerges from the rolls. These rolls are of greater length than the dimension of the width of the ribbon and as the molten glass passes between them squash it to form a ribbon of the desired thickness. The rolls are mounted for mutual adjustment to regulate the distance between their peripheries, which distance determines the thickness of the ribbon emerging from the rolls. This operation is sometimes referred to as "sizing."

During this operation of sizing the ribbon, the glass passes in intimate contact with the metal of the two rolls and accordingly a heat exchange is effected between the surfaces of the ribbon and the rolls, which may be more severe on the underface of the ribbon, so that the ribbon surfaces are cooled by loss of heat due to heat transfer to the rolls and thus stiffened and are permanently harmed by their contact with the rolls.

The ribbon is usually supported immediately after formation by a metal apron, or by a series of rollers, which direct the ribbon to a lehr in which the glass is annealed and set and thereby conditioned for presentation, in a continuous process, to grinders, and sometimes to polishers which operate on the glass after the grinding stages have been completed. To make the glass transparent, both faces must be ground and polished.

In the process of advancing the ribbon from the sizing rolls, further heat exchanges occur between the underface of the ribbon of glass and the apron or series of rollers, so that before the glass arrives at the rollers which direct the ribbon into apparatus in which it is annealed and set, it is sufficiently cooled to be passed over the rollers in the annealing apparatus.

In the manufacture of blown glass objects such as drinking goblets the surfaces are brilliant because the surfaces set as a result of heat losses achieved solely by radiation, and by heat exchange with a gaseous medium. This result is referred to by glass makers as "fire finish."

In another well known method of producing flat glass in continuous ribbon form the ribbon is formed by vertically drawing the ribbon from a body of molten glass and leading the ribbon over a bending roll by which the ribbon is directed into a horizontal lehr in which the ribbon is annealed and set.

A main object of the present invention is to produce flat glass in ribbon form, the faces of which have a brilliance of a quality such as that known as "fire finish," on emerging from the annealing stage, and another main object is to obtain a greater rate of production of transparent flat glass than is at present possible by the usual drawing methods of producing sheet glass or window glass.

Still another important object of the invention is to produce by rolling methods and at least at the usual rolling speeds a transparent flat glass which is the equivalent of that flat glass known as sheet glass or window glass, whereby the finished product is transparent and has a high quality lustre.

A further object of the present invention is to devise an improved method of and apparatus for producing a fire finish on flat glass produced in continuous ribbon form.

The present invention comprises a method of manufacturing transparent flat glass in continuous ribbon form in which the formed ribbon becomes stiffened by cooling before it enters a lehr where it is annealed, characterised in that a fire finish is produced on both surfaces of the ribbon by immersion in a bath of molten metal by directing the ribbon into a confined bath of molten metal and re-directing the ribbon out of the bath after a predetermined period of complete immersion, the temperature of the bath and the period of complete immersion being such that sufficient heat is imparted by the bath to the bight of the ribbon submerged in the bath to cause a superficial melting on both surfaces of the submerged ribbon, dissipating heat from the ribbon surfaces by radiation and by heat exchange with a gaseous medium to stiffen at least one surface of the ribbon after it has emerged from the bath, and then directing the cooled ribbon into the lehr in which the flat glass thus produced is annealed.

The ribbon may be formed on a casting surface, for example, by flowing the molten glass from which the ribbon is formed onto a casting roll where the glass is converted into a ribbon of predetermined width and thickness, or the ribbon may be produced by a drawing operation from a bath of molten glass.

A method of manufacturing transparent flat glass in accordance with the invention may be further characterized in that immediately after the ribbon has been formed, the ribbon is cooled to an extent that sufficient stiffness is attained by the ribbon to enable the ribbon to be thrust into the molten bath without losing the said predetermined dimensions of width and thickness, whilst retaining sufficient pliability to bend in the bath.

The present invention also comprehends apparatus for manufacturing transparent flat glass in continuous ribbon form in which the formed ribbon becomes stiffened by cooling before it enters a lehr where it is annealed, characterized by liquid means for producing a fire finish on the surfaces of the ribbon comprising a covered tank structure confining a bath of molten metal, the tank structure having an inlet and exit for the ribbon and being disposed in operative relationship with the ribbon forming means so as to permit the ribbon, as it is formed, to be directed into the bath by intersecting the surface of the bath, and disposed in operative relationship with the lehr whereby the traction forces in the lehr which operate on the ribbon to advance it through the lehr, are available to pull up the ribbon out of the bath of molten metal, and thermal regulators for the bath, whereby the bath is maintained hot relatively to the entering glass, the tank structure being arranged so that the lines of intersection of the ribbon and the bath surface are spaced apart to predetermine a period of immersion of a bight of the glass ribbon in the bath such that the surfaces only of the submerged bight are melted by the heat in the bath, and means for dissipating heat from the ribbon surfaces by heat exchange with a gaseous medium to stiffen at least one surface of the ribbon after it has emerged from the bath, and then directing the cooled ribbon into the lehr in which the flat glass thus produced is annealed.

From another aspect the invention comprises apparatus for use in manufacturing transparent flat glass in continuous ribbon form by forming the ribbon on a casting roll and after the ribbon of glass is stiffened by cooling, advancing the glass through a lehr where it is annealed, characterized by the combination with the casting roll, on which the ribbon is formed from molten glass, of a covered tank structure adapted to confine a bath of molten metal and having an inlet and exit for the ribbon, said structure being disposed in operative relation with the casting roll so that the formed ribbon is directed into the tank structure to intersect the surface of the bath, traction means for pulling the ribbon up and out through the surface of the bath and through the ribbon exit whereby a bight of the ribbon is subjected to heat exchange with the bath to superficially melt the surfaces of the bight, and means for dissipating heat from the ribbon surfaces by heat exchange with a gaseous medium of the emerging ribbon to stiffen at least one of the surfaces before the glass in the bight reaches the said traction means.

In order that the invention may be more clearly understood, reference will now be made to the accompanying diagrammatic drawings which show, by way of example, two embodiments of the present invention, in which:

Figure 1 is a diagrammatic sectional elevation showing a thermal treatment by a liquid bath in accordance with the invention in which the traction forces of a horizontal lehr are used to assist in moving the ribbon through the bath;

Figure 2 is a similar view showing a modified arrangement in association with a vertical lehr;

Figure 3 is a view showing apparatus similar to that shown in Figure 1, but including modified ribbon forming means; and Figure 4 illustrates, in sectional elevation, a modified construction hereinafter referred to.

In the drawings like references indicate the same or similar parts.

Referring first to the construction shown in Figure 1, a canal of a continuous glass melting tank is indicated at 1, the regulating tweel at 2 and the spout at 3, the spout comprising a floor or "lip" 4 and side jambs 5, one of which only is illustrated in Figure 1, the side jambs and lip forming a spout of large rectangular cross-section having a width slightly less than that of the ribbon to be produced.

The spout may, in well known manner, be provided with a cover, not shown. Associated with the spout is a pair of water-cooled casting rolls, the upper casting roll being indicated at 6 and the lower casting roll at 7. A gate 8 is disposed in contiguity with the casting roll 6 and is adjustably suspended in a vertical plane, in usual manner, by means not shown. The gate 8 shields the top roll 6 from the heat radiated by the molten glass 9 flowing through the canal 1 to and over the spout lip 4 to the pass between the rolls 6 and 7.

Heaters may be incorporated in the side jambs in the usual manner to maintain the jambs at a high temperature in order to minimise the temperature gradient across the spout.

The upper casting roll 6 is disposed in advance of the lower casting roll 7 so that the molten glass 9 flows from the spout lip 4 onto an upper part of the roll 7, this upper part constituting a forwardly and downwardly directed arcuate casting bed moving in the same sense as the free direction of flow from the spout so that the molten glass 9, on leaving the spout and arriving at this casting bed, is constrained to flow forwardly, thus preventing a backward flow of the glass leaving the spout lip 4.

The rolls 6 and 7 are adjustable one to the other in well known manner in order to effect the sizing of the ribbon produced, which is determined by the width of the pass between the rolls, thus the molten glass 9 which flows to the rolls is formed into a ribbon of predetermined width and thickness. The ribbon is indicated by the reference 10.

Below the lower casting roll 7 is arranged a water box 11, which extends from a point substantially contiguous to the line of separation of the ribbon 10 from the lower casting roll 7 towards an inlet 12 in the roof 13 of a tank structure 14 which constitutes a container for a bath 15 of molten metal. The roof 13 of the structure holding the bath 15 is provided with an exit 16.

The tank structure is arranged below the level of the casting rolls so that the ribbon 10 naturally moves to the inlet 12 under the influence of its own weight.

As clearly indicated in Figure 1, the formed ribbon 10 is thermally conditioned to enable it to be directed into the bath 15 and in so doing to intersect the surface of the bath, and a pliable bight formed so that the ribbon again intersects the surface of the bath as it is directed out of the bath through the exit 16, thereby the pliable bight of the ribbon is wholly submerged within the bath.

During the passage of the ribbon through the bath, the period of complete immersion of the ribbon in the bath is such as to cause a superficial melting of both surfaces of the submerged ribbon. By restricting the thermal treatment to which the ribbon is subjected in the bath to the surfaces of the ribbon, the body of the ribbon is substantially unaffected as regards its pristine stiffness before entering the bath.

At 17 is shown a horizontal lehr and at the entry end 18 a polished roll 19 is provided as well as the usual driven conveyor rolls 20, thus the tractive forces applied to the ribbon 10 by the roll 19 and the rolls 20 assist in moving the ribbon through the bath by pulling the ribbon, the speed of the casting rolls 6, 7 and the speed of the rolls such as 19, 20 in the lehr being adjusted as may be necessary to predetermine the length of the bight of ribbon wholly submerged within the bath at any one time, and to maintain a constant pull on the ribbon.

Before the ribbon enters the bath 15 it is partially cooled and thereby stiffened to enable the ribbon to be thrust into the bath without losing the dimensions of width and thickness produced on the casting roll, whilst retaining sufficient pliability to bend in the bath.

The weight of the length of partially cooled and therefore stiffened ribbon existing between the casting rolls and the bath naturally tends, by gravitational forces, to thrust the ribbon into the bath. This thrusting force may be assisted by the drive from the casting rolls 7 if the ribbon is partially cooled after leaving the roll to give sufficient stiffness to the ribbon to transmit the propulsive force derived from the rotation of the lower casting roll, whilst sufficient pliability is retained to enable a bight of the ribbon to be formed in the bath.

The partial cooling of the ribbon may be obtained by radiation by disposing near to, but in spaced relation with the underface of the ribbon, a water box 11 and in order to cool the other face of the ribbon, another similar water box may be employed. The water boxes are secured by brackets (not shown) to the casting machine which comprises the rolls 6, 7 and the means illustrated for supplying the molten glass to the rolls.

The water box 11 on the under-side of the ribbon may be replaced by a series of water cooled rollers in well known manner, and water cooled rollers 21 may be employed to guide the ribbon to the inlet 12, such rollers 21 being mounted on the roof structure, as will be readily understood.

In order that the bight of the ribbon which has passed through the bath shall not be harmed as a result of moving over the roll 19 and the rolls 20 of the lehr 17, both surfaces of the ribbon on leaving the bath are subjected to a heat exchange with a gaseous medium, usually air, in order to cool the two surfaces so that (whilst retaining some flexibility) they may be in sufficiently stiffened condition before meeting the roll 19, to pass over it unharmed. Accordingly the ribbon passes over the rollers 20 in the lehr in a condition such that it is incapable of plastic impression deformation by contact with the rollers. The cooling jets for effecting this heat exchange are indicated at 22.

The bath 15 through which the ribbon is drawn is a liquid bath of molten metal and this bath may be of a specific gravity which is substantially higher than that of the glass from which the ribbon is formed, e.g. a bath of molten tin or one in which tin predominates, the bath being at an elevated temperature, e.g. 1200° C. or somewhat higher.

Alternatively the bath may be formed of a molten metal which in the liquid form has a specific gravity which is not appreciably greater than that of the glass, e.g. a bath of an alloy of aluminum and tin, in which the aluminum predominates, and in such a bath the ribbon can be made to sink into the molten metal by the thrust given to the ribbon. The bath may be constituted by 80% aluminum and 20% tin.

Clearly the molten metal used as the bath must be substantially inert with respect to the material from which the confining tank structure 14, 13 is made and must be substantially incapable of forming reaction products which would adversely affect the quality of the glass and must not stick to the glass.

Generally speaking the temperature of the bath is required to be 1200° C. or somewhat higher, in order to effect the flash heating which is required to restrict the melting effect to the surfaces of the ribbon. The melting point of tin is known to be 232° C. and the melting point of the metallic mixture of aluminum and tin in the proportion of 4 to 1 aluminum to tin is 658° C.

The advantage of using molten metal as the bath is that it permits a substantially frictionless passage of the ribbon whilst submerged in the bath whilst the heat conductivity of the metal assures a uniform temperature to be achieved. A bath may be employed containing a metallic mixture of tin with another metal, or metals, such as aluminum or lead, to adjust the specific gravity of the bath as may be desired.

The roof 13 of the tank structure is supported by the wall of the structure and is provided with bars 23 near the inlet and outlet openings which not only reinforce the roof but form a liquid seal at each end of the bath by dipping into the bath, so that only the relatively small surface of the bath which is intersected by the ribbon on entering and leaving the bath is in communication with the atmosphere and the head space above the end surfaces may be charged by pipes 24, 25 with a gas which does not react with the metal and is at a pressure which prevents the entry of atmospheric air. The gas admitted is conveniently ordinary mains gas which is a reducing gas.

It is to be observed that the roof 13 is near to the surface of the bath, indeed the inner face may lie in contiguity with the surface of the bath, and the provision of the bars 23 assures that any dross or any oxide formed on the bath surface and collected on the surface is segregated from the ribbon, and in case the arrangement permits and it is desired to charge or to circulate in the space between the roof and the bath a gas to prevent oxidation of the metal at the surface, i.e. between the liquid seals, inlet and outlet pipes for the gas, indicated at 26, 27 respectively, are provided in the roof.

The bath may be provided with submerged heaters as indicated at 28 to maintain the desired temperature for the bath.

The arrangement shown in Figure 2 is similar to that shown in Figure 1 except that the ribbon, after leaving the tank structure, is taken up a vertical lehr 29 in which it is annealed after passing between the chilling jets 22, this lehr including in usual manner pairs of driving rolls 30 only the lowermost pair of which is shown, through which pairs the ribbon 10 passes. In such arrangement the jets 22 serve to chill the ribbon to stiffened condition previously to entering the lehr.

As shown in Figures 3 and 4, the ribbon may be produced on the casting roll 7 by flowing the molten glass over a spout lip 4, having a convex surface 31 so that the glass spreads to the desired dimensions of width and thickness on the lip, the marginal areas of the ribbon only being engaged by driven edge rolls 32, the rims of which are preferably patterned, e.g. by milling, to not only chill the edges of the ribbon and thereby maintain the intended dimension for the ribbon, but also to bite into the margins of the ribbon and help drive it forward. Thus a considerable propelling force is derived from the edge rolls 32 for the ribbon which can be utilised in directing the ribbon into the bath.

In the modification shown in Figure 4, the roof structure 13 comprises an underface 33 which dips into the molten metal of the bath 15 between the inlets and outlets of the bath, and as shown in Figure 4 the roof structure 13 may be formed with an external well 34 to lighten the structure.

To assist in thrusting the ribbon into the bath the rollers 21 may be driven rollers actuated by gearing (not shown) in synchronisation with the casting roll 7.

In the appended claims, reference is made to the preforming of a ribbon of glass to definite dimensions of width and thickness, and cooling of the ribbon to an extent sufficient to make it stiff enough to stabilize its dimensions, before the glass reaches the bath of molten metal. Such stable condition of the glass in ribbon form is produced, for example, when molten glass is flowed onto a cooled metal roll to cast the ribbon on the roll or when the molten glass is flowed in conventional manner through the pass between a pair of cooled sizing rolls, the cooling of the glass in its ribbon form being effected in both cases by heat exchange with the casting roll or the sizing rolls as the case may be.

The present invention is to be distinguished from prior art disclosures according to which a glass ribbon is formed by flowing the molten glass directly upon the surface of a molten metal bath and gradually cooling the glass by contact with the molten metal as the glass is advanced along the surface thereof. Such prior art processes do not possess the advantages which characterize the present invention and which have been fully set forth in the preceding detailed description.

I claim:

1. In an apparatus for manufacturing transparent flat glass in continuous ribbon form, the combination with means for preforming a ribbon of glass to definite dimensions of width and thickness, means for cooling the ribbon to an extent sufficient to make it stiff enough to stabilize its dimensions while it retains sufficient pliability to be bent, and a lehr wherein said ribbon is annealed, of a covered tank structure containing a bath of molten metal, and including an inlet passageway and an outlet passageway, means for continuously directing the preformed stiffened ribbon through said inlet passageway and downwardly into said bath to completely submerge the ribbon therein and for continuously redirecting the submerged ribbon upwardly and then out through said outlet passageway while maintaining the ribbon after emerging from said bath out of contact with said bath and thermal regulators for the bath whereby the bath is maintained hot relatively to the entering preformed stiffened ribbon, the tank structure being arranged so that the lines of intersection of the ribbon and the bath surfaces are spaced apart to predetermine the period of immersion of a bight of the preformed stiffened ribbon in the bath such that the surfaces only of the submerged bight are melted by the heat in the bath as the ribbon passes through said bath, means for dissipating the heat from the ribbon surfaces by heat exchange with a gaseous medium to sufficiently cool and stiffen at least one melted surface of the ribbon after it has emerged from the bath to permit the ribbon to be advanced therefrom without damage, and means for then directing the cooled ribbon into the lehr in which the flat glass thus produced is annealed.

2. A method of manufacturing transparent flat glass in continuous ribbon form, which comprises the steps of preforming a ribbon of glass to definite dimensions of width and thickness, cooling the ribbon to an extent sufficient to make it stiff enough to stabilize its dimensions while it retains sufficient plability to be bent, thereafter directing the preformed stiffened ribbon downwardly into a confined bath of molten metal and then redirecting it upwardly out of said bath by causing the ribbon to intersect the surface of the bath as it enters and leaves the bath, respectively, and thus producing a resilient bend in the ribbon between its lines of intersection with the bath surface, the temperature of the bath and the period of complete immersion of the ribbon in the bath being such that sufficient heat is imparted by the bath to the ribbon to cause a superficial melting of both surfaces thereof, then after the ribbon has emerged from the bath dissipating heat from the ribbon surfaces by radiation and by heat exchange with a gaseous medium to sufficiently cool and stiffen at least one melted surface of the ribbon after it has emerged from the bath to permit the ribbon to be advanced therefrom without damage, and then directing the cooled ribbon to a lehr in which the flat glass thus produced is annealed.

3. A method of manufacturing transparent flat glass in continuous form comprising the steps of progressively preforming a ribbon of glass to definite dimensions of width and thickness, progressively cooling the ribbon to an extent sufficient to make it stiff enough to stabilize its dimensions while it retains sufficient pliability to be bent, thereafter directing the preformed stiffened ribbon downwardly into a confined bath of molten metal and then redirecting the ribbon upwardly out of said bath by causing the ribbon to intersect the surface of the bath as it enters and leaves the bath, respectively, and thus producing a resilient bend in the ribbon between its lines of intersection with the bath surface, maintaining the bath at a temperature high enough to cause the progressive melting of both surfaces of the preformed stiffened ribbon while avoiding the melting of the main body of the ribbon, and then after the ribbon has emerged from the bath dissipating heat from the melted surfaces thereof by radiation and by heat exchange with a gaseous medium to sufficiently cool and stiffen the melted surfaces of the ribbon to permit the ribbon to be advanced without damage by contact with mechanical conveying means.

References Cited in the file of this patent

UNITED STATES PATENTS

| | | |
|---|---|---|
| 710,357 | Heal | Sept. 30, 1902 |
| 789,911 | Hitchcock | May 16, 1905 |
| 2,478,090 | Devol | Aug. 2, 1949 |
| 2,525,203 | Bostroem | Oct. 10, 1950 |
| 2,556,349 | Trautman | June 12, 1951 |
| 2,826,868 | Wynne et al. | Mar. 18, 1958 |
| 2,838,800 | Hertz | June 17, 1958 |
| 2,911,759 | Pilkington et al. | Nov. 10, 1959 |

FOREIGN PATENTS

| | | |
|---|---|---|
| 1,082,879 | France | June 23, 1954 |
| 1,117,465 | France | Feb. 27, 1956 |
| 769,692 | Great Britain | Mar. 13, 1957 |